Jan. 13, 1948. R. C. PIERCE 2,434,583
SNUBBED QUICK WHEEL CHANGE TRUCK
Filed Oct. 2, 1944 2 Sheets-Sheet 1
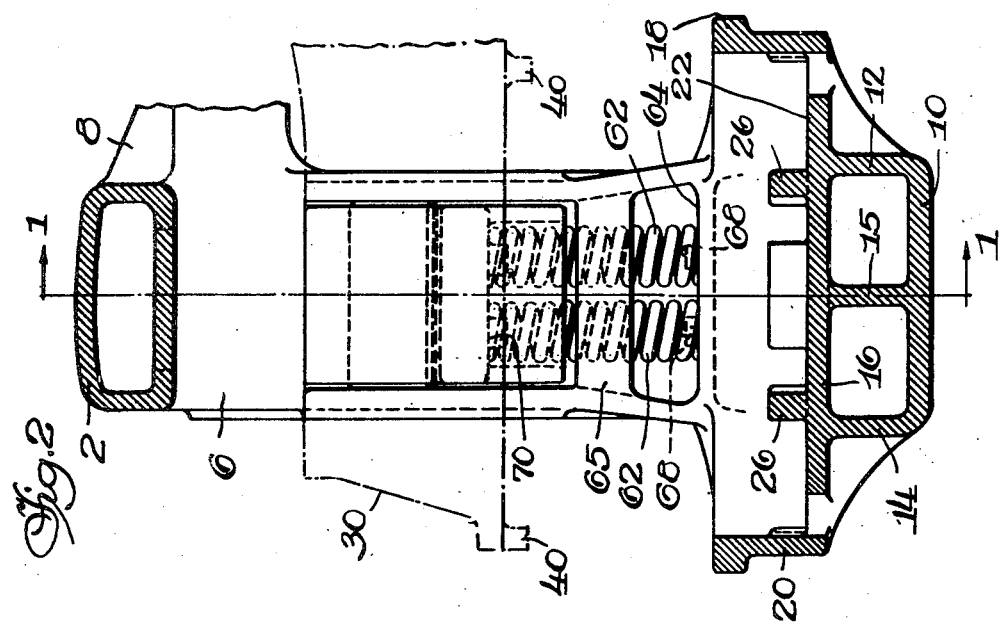
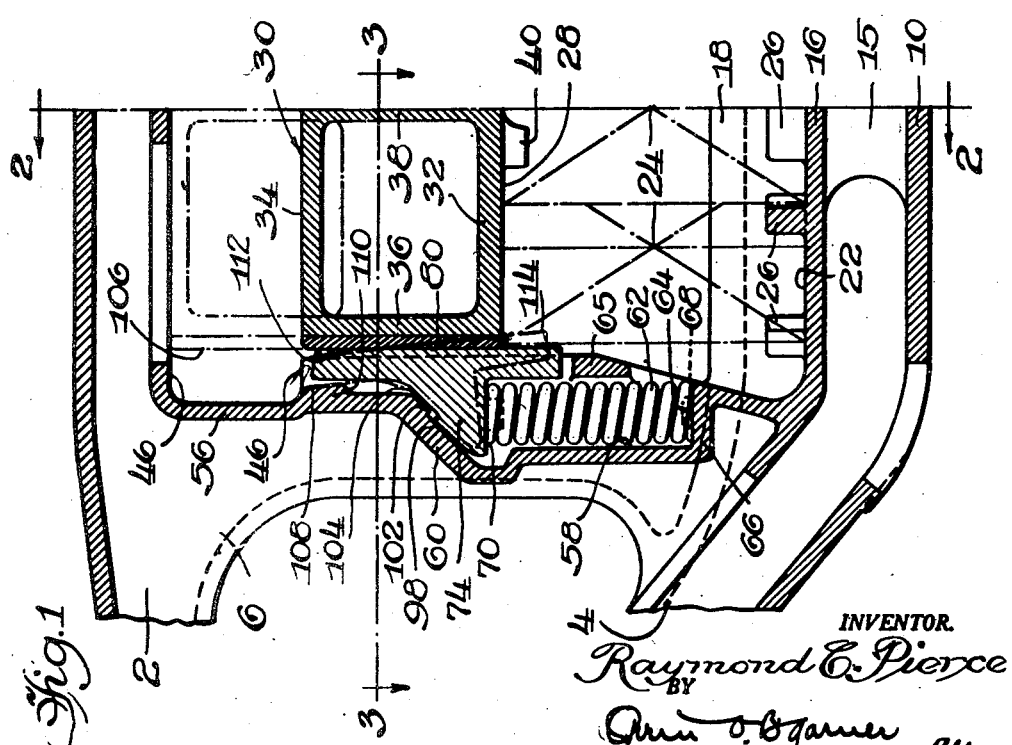
INVENTOR.
Raymond E. Pierce
BY
Ann O. Garner
Atty.

Jan. 13, 1948.　　　　　R. C. PIERCE　　　　　2,434,583
SNUBBED QUICK WHEEL CHANGE TRUCK
Filed Oct. 2, 1944　　　　　2 Sheets-Sheet 2
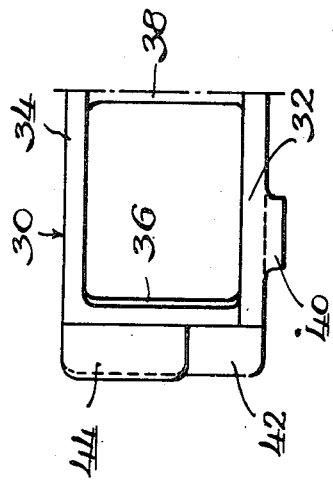
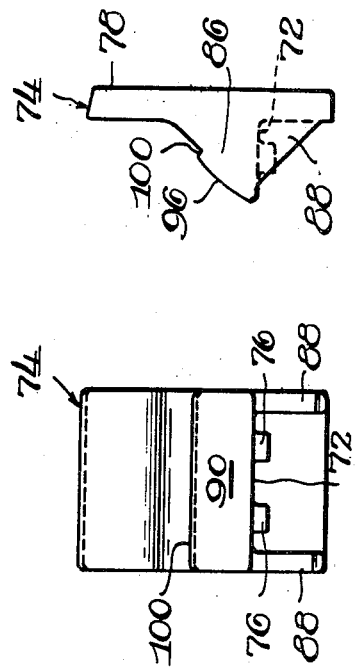
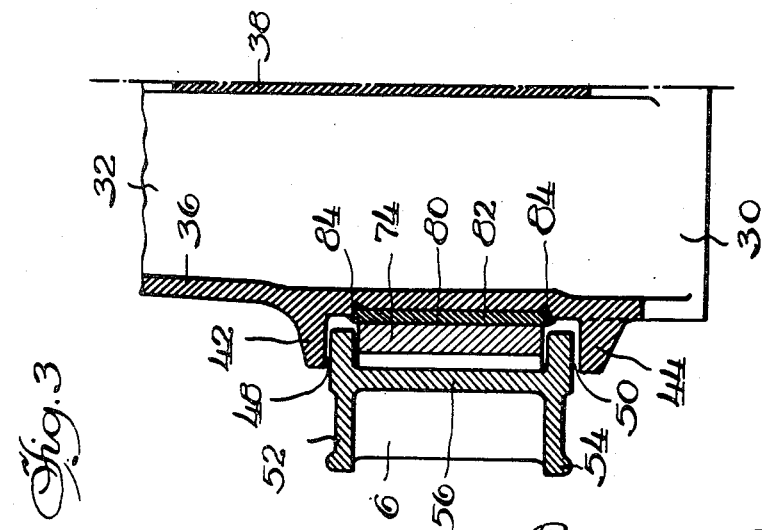
INVENTOR.
Raymond E. Pierce
BY
Orin O. B. Garner
Atty.

Patented Jan. 13, 1948

2,434,583

UNITED STATES PATENT OFFICE 2,434,583

SNUBBED QUICK WHEEL CHANGE TRUCK

Raymond C. Pierce, Chicago, Ill.

Application October 2, 1944, Serial No. 556,709

21 Claims. (Cl. 105—197)

My invention relates to a railway car truck and more particularly to a four wheel truck of the type commonly described as quick wheel change wherein the bolster, the side frame, and the spring group, as well as other parts, are so arranged as to permit removal of the bolster from the side frame for a wheel change or other purpose without disturbing the spring group.

My invention also contemplates such an arrangement as that described wherein may be embodied snubbing means for damping the action of the spring group.

A more specific object of my invention is to devise a quick wheel change snubbed freight car truck wherein the side frame may have bolster guide columns in usual manner and said columns may house friction shoes for engagement with the side walls of the intervening bolster or with friction plates on said side walls.

A different object of my invention is to devise a truck as that described wherein the friction shoes may be so mounted in the columns as to permit their slight rotation from normal operating position when it is desired to remove the bolster, said rotation permitting the shoes to seat in a stable position against the side frame columns, suitable for readmission of the bolster into the bolster opening, as desired.

In the drawings, Figure 1 is a fragmentary sectional view of a railway car truck embodying my invention, the section being taken substantially in the longitudinal center line of the side frame as illustrated at 1—1 in Figure 2. Figure 2 is a sectional view transversely of the truck illustrated in Figure 1, the section being taken approximately in the vertical plane bisecting the truck transversely as indicated by the line 2—2 of Figure 1. Figure 3 is a further sectional view through the truck illustrated in Figures 1 and 2, the section being taken approximately in the horizontal plane indicated by the line 3—3 of Figure 1. Figure 4 is a half end elevation of the bolster illustrated in Figures 1, 2, and 3. Figures 5 and 6 show my novel form of friction shoe, Figure 5 being a plan view of the column engaging face thereof and Figure 6 a side elevation.

Describing my novel truck in detail, the side frame is of generally conventional cast steel type including the compression member 2 and the tension member 4 with the integral bolster column 6, said compression member having the brake hanger bracket fragmentarily shown at 8, said columns and the intermediate portion of said tension member having the box section well illustrated in Figure 2 with the bottom chord 10, the inboard and outboard walls 12 and 14, the intermediate web 15, and the top chord 16, widened and formed with inboard and outboard flanges 18 and 20 defining the spring seat 22 between the columns. On the spring seat 22 may be positioned a plurality of coil springs diagrammatically indicated at 24, 24, said springs being positioned by the side walls 18 and 20 and by other positioning means 26, 26 upstanding from the seat 22. On the springs 24, 24 may seat as at 28 the bolster, generally designated 30, said bolster having an end portion of box section with the bottom wall 32, the top wall 34, the side wall 36, and the intermediate wall 38. From said bottom wall may depend other spring positioning means 40, 40. The bolster 30 may have inboard and outboard column guides 42 and 44 (Figure 3), said inboard guides having the full depth of the bolster end and said outboard guides having a reduced depth, as illustrated in Figure 4, said reduced depth being such as to accommodate said outboard lugs within the widened top portion of the bolster opening as indicated at 46 (Figure 1) so that said bolster may be elevated to the top of said bolster opening and removed without disturbing the supporting spring group or the friction means normally engaging the side walls of the bolster.

The inboard and outboard guide lugs on the bolster may have such clearance from the inboard and outboard face of the adjacent column 6 as illustrated at 48 and 50 (Figure 3) so that the desirable amount of relative lateral movement between the bolster and guide column may be permitted. Each side frame column is formed with an inboard vertical web 52 (Figure 3), an outboard vertical web 54 and a transverse web 56, said transverse web following an irregular course throughout the length of the column to define with said side walls adjacent the bottom of each column a pocket 58, a portion of said pocket being defined by the diagonal portion or wall 60 of said transverse web, as well seen in Figure 1.

Within each pocket 58 may be housed a plurality of auxiliary springs 62, 62, each of said springs being seated as at 64 on the horizontal ledge 66 adjacent the bottom of the column. The integral transverse bar 65 extending between the inboard and outboard webs of the column adjacent the base thereof may help to retain the springs 62, 62. Each spring may be fitted over a positioning lug 68. The upper ends of the springs 62, 62 may seat as at 70 against the spring seat 72 on the friction shoe 74 and be positioned with respect thereto by means of the depending lugs 76, 76. Each friction shoe 74 may have a generally rectangular form with the overall friction face 78, which may bear as at 80 against the wear plate 82, slightly recessed in the adjacent bolster side wall 36 and fixed thereon as at 84, 84, as well seen in Figure 3. Each friction shoe may have an intermediate thickened portion or ledge 86 defined at the bottom thereof by the before-mentioned spring seat 72 and reinforced therebelow by the integral lateral ribs 88, 88. Said ledge 86 may have a diagonally arranged top face 90 crowned as at 96 (Figure 6) and afforded a seat as at 98 (Figure 1) against the before-mentioned diagonal wall 60. The top face 90 of each shoe may be interrupted by a transverse shoulder at 100 extending across the width thereof and having some slight clearance from the mating shoulder 102 formed on said diagonal wall 60. When the parts are in operative position, as illustrated in Figure 1, the portion of the shoe ledge 86 above the shoulder 100 has some slight clearance as at 104 from the adjacent portion of the web 56 for a purpose to be hereafter more clearly set forth.

With the parts in their normal operating positions as illustrated in Figure 1, it will be seen that each friction shoe 74 is urged against the adjacent side wall of the bolster by a force in part determined by the engaging angle between the wall 60 and the face 96 on the friction shoe and in part by the pressure exerted by the springs 62, 62. With the friction shoes mounted in the column walls as here illustrated, considerable latitude is permitted in the design of the springs which may be modified substantially as desired.

For wheel change, the bolster may be elevated to the top of the bolster opening, as shown in phantom lines at 106. As said bolster is elevated, each friction shoe 74 will be permitted some slight rotation about its seat at 98 until the top thereof seats as at 108 against the ledge 110 on the transverse web 56 adjacent the widened portion of the bolster opening. At the same time, the friction shoe 74 will move slightly upwardly until the shoulder 100 of the shoe engages the mating shoulder 102 on the wall 60. The engaging wedging surfaces of the shoe 74 and the wall 60 at 98 are somewhat eccentric with respect to the center line of each spring 62, thus causing the shoe 74 to rotate or tilt as the bolster is elevated. When the upper end of the shoe seats as at 108, the friction face 78 thereof will have appreciable clearance from the bottom edge of the side wall of the bolster, as may readily be seen at 112. As the shoe 74 reaches its uppermost position against the shoulder at 102 with the top edge thereof bearing at 108, the maximum rotation or tilting of the shoe is illustrated by the phantom lines at 114, and the pressure of the springs 62, 62 urging the shoe 74 against said shoulder will be sufficient to maintain each shoe 74 in its assembled relationship within the column pocket so that after wheel change, the bolster may be reassembled with respect to the side frame simply by inserting the end within the bolster opening and lowering it into position.

It will readily be understood that the shoe 74 will remain in its normal operative position with the vertical friction face in engagement with the vertical wear plate on the adjacent bolster side wall as the bolster moves up and down under ordinary service conditions. When the bolster is elevated approximately to the top of the bolster opening, however, a point will be reached where the lower end of the friction shoe will project into the bolster opening and the upper end thereof will be tilted in the opposite direction to bear at 108 as previously described. This tilting movement will begin when the lower edge of the bolster is elevated to or slightly above the level of the ledge or shoulder 102 on the diagonal wall 60 of the column. As this tilting movement begins, the shoe at the same time will be urged upwardly by the auxiliary spring 62 until the shoe engages the shoulder at 102. Further tilting of the shoe is prevented by its reaching the aforementioned fixed position. The shoe cannot fall into the bolster opening, however, because the spring 62 maintains it in firm engagement with the shoulder at 102.

It will thus be seen that I have designed a novel but relatively simple form of quick wheel change snubbed truck wherein the friction shoes may be so mounted in the columns as to accommodate associated auxiliary springs of any reasonably desired capacity, said friction shoes also affording large friction areas for bearing against the side walls of the bolster and being so mounted as to permit its automatic shift from normal operating position to a fixed inoperative position as the bolster is elevated for removal from the bolster opening. Obviously, if it is desired to remove or replace a friction shoe, the associated auxiliary springs may be sufficiently depressed to admit of such action.

It is understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a side frame having tension and compression members and spaced columns defining a bolster opening, a bolster spring-supported in said opening, each of said columns housing snubbing means including an auxiliary spring and a wedge shoe, said auxiliary spring urging said wedge shoe into engagement with a diagonal web of the enclosing column and the adjacent bolster side wall, said web having a shoulder, the bearing between said shoe and said diagonal web being eccentric with respect to the axis of said auxiliary spring, whereby elevation of said bolster above normal operating position in said opening automatically permits said auxiliary spring to thrust said shoe against said shoulder and tilt said shoe to a fixed inoperative position free of said bolster as said bolster approaches the top of said opening, and other interengaging means on said shoe and the enclosing column limiting the tilting movement of said shoe.

2. In a railway car truck, a side frame having spaced columns defining in part a bolster opening, a bolster spring-supported in said opening, snubbing means in each column including an auxiliary spring and a wedge friction shoe, said shoe having flat face engagement with the adjacent bolster side wall and having a crowned face bearing against a diagonal portion of an intermediate web of said column, interengageable stop means on said shoe and web, said shoe being clear of said web above and below said bearing to permit tilting thereof about said bearing under actuation of said auxiliary spring as said bolster is elevated in said opening and said stop means are engaged, said tilting permitting said shoe to seat against said web at a point spaced from said bearing, whereby said shoe assumes a fixed position in said column clear of said bolster as said bolster is elevated to the top of said opening.

3. In a railway car truck, a side frame having spaced columns defining in part a bolster opening, a bolster spring-supported in said opening, snubbing means housed in each column including an auxiliary spring, a friction shoe having flat face engagement with the adjacent bolster side wall and having an arcuate wedge face bearing against a diagonal portion of a web of the enclosing column, the bearing of said shoe against said web being eccentric with respect to the axis of said auxiliary spring, whereby said spring may automatically tilt said shoe about said bearing to a fixed position in said column as said bolster is elevated to the top of said opening, and interengaging means on said shoe and said web limiting the tilting movement thereof.

4. In a railway car truck, a side frame having tension and compression members and spaced columns defining a bolster opening, a bolster spring-supported in said opening, each of said columns housing snubbbing means including an auxiliary spring and a wedge shoe, said auxiliary spring urging said wedge shoe into engagement with a diagonal web of the enclosing column and the adjacent bolster side wall, the bearing between said shoe and said diagonal web being eccentric with respect to the axis of said auxiliary spring, whereby elevation of said bolster above normal operating position in said opening automatically permits said auxiliary spring to tilt said shoe to a fixed inoperative position as said bolster approaches the top of said opening, said shoe in said last-mentioned position having stop means engaging an abutment on said diagonal web.

5. In a railway car truck, a side frame having spaced columns, a bolster spring-supported therebetween, snubbing means housed in each column including an auxiliary spring and a friction shoe eccentrically mounted on said spring and having a flat friction face engaging the adjacent bolster side wall and an arcuate wedge face bearing against a diagonal web of the adjacent column, interengageable stop means on said shoe and said web, said auxiliary spring being operative to thrust said shoe upwardly and engage said stop means and thereafter to tilt said shoe as said bolster is elevated above normal operative position whereby the lower end of said shoe may be freed of engagement with said bolster and the upper end of said shoe may engage the adjacent column, permitting said shoe to assume a fixed position free of said bolster and said bolster to be withdrawn from said side frame.

6. In a railway car truck, a side frame having a bolster opening defined in part by guide columns at opposite sides thereof, a bolster projecting into said opening with guide means engaging said columns, each of said columns housing snubbing means comprising an auxiliary spring and a friction shoe urged by said spring into wedge engagement between a diagonal wall of the enclosing column and the adjacent bolster side wall, and interengaging shoulders on said diagonal wall and said shoe limiting the upward movement of said shoe, said auxiliary spring being operative automatically to rotate said shoe about a seat on said diagonal wall as a fulcrum to a fixed position within said pocket affording clearance from said bolster when elevated to the top of said opening.

7. In a railway car truck, a side frame having a compression member, a tension member, and spaced columns defining a bolster opening, each of said columns having a pocket defined in part by a diagonal web, said pocket housing a vertical spring and a friction shoe urged by said spring into wedge engagement between said diagonal web and the adjacent bolster side wall, engaging shoulders on said shoe and diagonal web limiting the movement of said shoe along said web under the impulse of said spring, said spring being eccentrically fitted against said shoe and thereby operative to tilt said shoe as said shoulders engage upon upward movement of said bolster which permits the lower end of said shoe to clear the adjacent bolster side wall and project into said bolster opening as the upper end thereof bears against an adjacent portion of said column whereby said shoe assumes a fixed position clear of said bolster as it reaches the uppermost position in said bolster opening, thus permitting removal of said bolster from said opening while said shoe and spring remain in assembled relationship with said column.

8. In a railway car truck, a side frame having a compression member, a tension member, and spaced columns defining a bolster opening, each of said columns having a pocket defined in part by a diagonal web, said pocket housing an auxiliary spring and a friction shoe in wedge engagement between said diagonal web and the adjacent bolster side wall, engaging stop means on said shoe and said web, the bearing of said shoe against said diagonal web being eccentrically positioned with respect to the center line of said auxiliary spring so that said spring is operative automatically to rotate said shoe about said bearing to a fixed position in said pocket affording clearance from said bolster when elevated to the top of said opening, elevation of said bolster to the top of said opening permitting said shoe to move along said web until said shoulders are engaged.

9. In a railway car truck, a side frame having top and bottom members and spaced columns defining a bolster opening, a bolster spring-supported in said opening, each of said columns having inboard and outboard webs and a transverse web defining a pocket therein and a friction shoe resiliently mounted in said pocket and bearing against the adjacent bolster side wall and having wedge engagement with a diagonal portion of said transverse web, engaging stop means on said shoe and said diagonal portion, each of said shoes fulcruming against said diagonal portion to rotate automatically from its normal vertical position to a tilted position affording clearance from said bolster when said bolster is elevated to the top of said opening for removal therefrom, said stop means limiting the upward movement of said shoe as said bolster is elevated.

10. In a railway car truck, a side frame having spaced columns, a bolster opening therebetween, a bolster spring-supported from said frame in said opening, an auxiliary spring in each column, a vertically positioned wedge shoe on said spring, said spring being operative to urge said shoe into wedge engagement between a diagonal wall of the enclosing column and the adjacent bolster side wall, and interengageable stop means on said shoe and said diagonal wall eccentrically positioned with respect to the axis of said spring, said spring being operative to move said shoe upwardly as the bottom of said bolster clears said shoe as said bolster is elevated above the position of said stop means, further elevation of said bolster to the top of said opening permitting said shoe to tilt under the impulse of said spring and the upper end thereof to abut the adjacent column whereby said shoe may assume a position clear of said bolster while remaining in assembled relationship with said spring in said column.

11. In a railway car truck, a side frame having a bolster opening defined in part by spaced columns, a bolster spring-supported in said opening between said columns, an auxiliary spring seat in each column, an auxiliary spring thereon resiliently supporting a friction shoe in wedge engagement between a diagonal wall of said column and the adjacent bolster side wall, engaging stop means on said diagonal wall and said shoe, said shoe having a bearing against said diagonal wall below said stop means and eccentric with respect to the axis of said auxiliary spring whereby elevation of said bolster to a position above said stop means automatically permits said spring to rotate said shoe to a fixed position in said column clear of said elevated bolster.

12. In a railway car truck, a side frame having spaced columns, a bolster spring-supported intermediate said columns, snubbing means in each column including an auxiliary spring supporting a wedge friction shoe, said shoe having flat face engagement with the adjacent bolster wall and having a crowned face bearing against a diagonal web of the adjacent column, interengageable stop means on said shoe and web eccentrically positioned with respect to the axis of said spring, the upper end of said shoe having clearance from said column above said stop means to permit limited rotation thereof to a fixed position under actuation of said auxiliary spring as said bolster is elevated in said opening and said stop means are engaged and the upper end of said shoe is brought into engagement with the adjacent column.

13. In a railway car truck, a side frame having a bolster opening defined in part by spaced columns, a bolster spring-supported on said frame between said columns, each of said columns housing a resiliently mounted shoe in wedge engagement between a diagonal wall of the column and the adjacent bolster side wall, engageable stop means on each shoe and the adjacent diagonal wall, said stop means being eccentrically positioned with respect to the resilient mounting of the associated shoe, the upper end of each shoe having clearance from the adjacent column, said opening having a height sufficient to accommodate elevation of said bolster therein to a position free of said shoes, such elevation of said bolster permitting said stop means to be engaged and each shoe to rotate thereabout until the upper end thereof engages the adjacent column.

14. In a railway car truck, a side frame having a bolster opening defined in part by spaced columns, a bolster spring-supported on said frame between said columns, each of said columns housing an auxiliary spring supporting a shoe in wedge engagement between a diagonal wall of the column and an adjacent bolster wall, interengageable stop means on each shoe and the adjacent diagonal wall, said stop means being eccentrically positioned with respect to the adjacent auxiliary spring, each shoe having its upper end spaced from the adjacent column, said opening having a height sufficient to accommodate elevation of said bolster clear of said shoes, such elevation of said bolster permitting said shoes to move upwardly until said stop means engage each other and each shoe to rotate about the associated stop means to a fixed position wherein the upper part thereof engages the adjacent column.

15. In a railway car truck, a side frame having spaced columns defining in part a bolster opening, a bolster spring-supported on said frame between said columns, and snubbing means for said bolster comprising an auxiliary spring eccentrically supporting a friction shoe in each column in wedge engagement between a diagonal wall of said column and the adjacent bolster side wall, and interengageable stop means on said shoe and the adjacent diagonal wall, each auxiliary spring being operable to elevate the associated shoe into engagement with the adjacent stop means and to tilt said shoe so that the upper end thereof may abut the adjacent column and said shoe may assume a fixed position as said bolster is elevated in said opening above the position of said stop means and free of said shoes.

16. In a railway car truck, a side frame having a bolster opening defined in part by guide columns at opposite sides thereof, a bolster projecting into said opening with guide means engaging said columns, each of said columns housing snubbing means comprising an auxiliary spring and a friction shoe urged by said spring into wedge engagement between a diagonal wall of the enclosing column and the adjacent bolster side wall, and interengaging shoulders on said diagonal wall and said shoe limiting the upward movement of said shoe, each auxiliary spring being operatable to tilt the associated shoe into a position free of said bolster as said bolster is elevated in said opening to a position above said shoulders.

17. In a railway car truck, a side frame having top and bottom members and spaced columns defining a bolster opening, a bolster spring-supported in said opening, each of said columns having inboard and outboard webs and a transverse web defining a pocket therein, and a friction shoe resiliently mounted in said pocket and bearing against the adjacent bolster side wall and having wedge engagement with a diagonal portion of said transverse web, complementary stop means on each shoe and the adjacent diagonal portion, said stop means being engageable as said shoe moves upwardly with said bolster when said bolster is elevated to the top of said opening above the level of said stop means, said upward movement of said shoe being limited by said stop means, and said auxiliary spring being operable thereafter to tilt said shoe to a position free of said bolster.

18. In a railway car truck, a side frame having tension and compression members and spaced columns defining a bolster opening, bolster springs on said tension member between said columns, a bolster on said springs, and snubbing means for said bolster comprising a friction shoe resiliently mounted in each column and normally bearing against the adjacent bolster side wall and against a diagonal web of the enclosing column, interengaging stop means on each shoe and the adjacent web operable to limit the upward movement of said shoe as said bolster is elevated to the top of said opening for wheel change, said upward movement of said bolster to a position above said stop means permitting each of said shoes to be tilted by the associated resilient means to a position free of said bolster.

19. In a railway car truck, a side frame having a column, a bolster spring-supported adjacent said column, an auxiliary spring in said column supporting a friction shoe in engagement with a diagonal web of said column and an adjacent side wall of said bolster, engageable shoulders on said web and shoe, said shoe having its upper end free of said column above said shoulders, and said spring being eccentrically positioned with respect to said shoulders and operable to urge said shoe upwardly to engage said shoulders and to rotate said shoe thereabout to bring the upper end thereof into engagement with said column as said bolster is elevated to a position free of said shoe.

20. In a railway car truck, a side frame having a column at one side of a bolster opening, a bolster resiliently mounted in said opening, an auxiliary spring in said column supporting a wedge shoe engaging a diagonal web of said column and the adjacent side wall of said bolster, engageable stop means on said shoe and web eccentrically positioned with respect to said spring, the upper end of said shoe having clearance from said column in normal operating position when said stop means are out of engagement, elevation of said bolster in said opening to a position above said stop means permitting said auxiliary spring to thrust said shoe upwardly until said stop means engage and thereafter to rotate said shoe until the upper end thereof engages said column, whereby said shoe seats in a fixed position in said column as said bolster is elevated and removed from said opening.

21. In a railway car truck, a side frame having a column at one side of a bolster opening, a bolster resiliently mounted in said opening, an auxiliary spring in said column supporting a wedge shoe engaging a diagonal web of said column and the adjacent side wall of said bolster, the engagement of said shoe and said web being along non-complementary surfaces, engageable stop means on said shoe and web eccentrically positioned with respect to said spring, the upper end of said shoe having clearance from said column in normal operating position when said stop means are out of engagement, elevation of said bolster in said opening to a position above said stop means permitting said auxiliary spring to thrust said shoe upwardly until said stop means engage and thereafter to rotate said shoe until the upper end thereof engages said column, whereby said shoe seats in a fixed position in said column as said bolster is elevated and removed from said opening.

RAYMOND C. PIERCE.

REFERENCES CITED

The following references are of record in the file of this patent:

UNITED STATES PATENTS

| Number | Name | Date |
| --- | --- | --- |
| 2,159,138 | Duryea | May 23, 1939 |
| 2,277,263 | Tucker | Mar. 24, 1942 |
| 2,352,693 | Davidson | July 4, 1944 |